United States Patent
Dover

(10) Patent No.: US 6,920,534 B2
(45) Date of Patent: Jul. 19, 2005

(54) VIRTUAL-PORT MEMORY AND VIRTUAL-PORTING

(75) Inventor: Lance W. Dover, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 09/895,982

(22) Filed: Jun. 29, 2001

(65) Prior Publication Data

US 2003/0005239 A1 Jan. 2, 2003

(51) Int. Cl.$^7$ .................. G06F 13/18; G06F 12/00
(52) U.S. Cl. .................. 711/151; 711/169; 710/39; 710/40
(58) Field of Search ................ 711/150, 151, 711/158, 168, 169; 710/39, 40, 244

(56) References Cited

U.S. PATENT DOCUMENTS

| 5,197,130 | A | * | 3/1993 | Chen et al. ............ 712/3 |
| 5,208,914 | A | * | 5/1993 | Wilson et al. .......... 710/39 |
| 6,091,618 | A | | 7/2000 | Fazio et al. |
| 6,622,225 | B1 | * | 9/2003 | Kessler et al. .......... 711/158 |
| 6,651,148 | B2 | * | 11/2003 | Widdup ................ 711/158 |

OTHER PUBLICATIONS

INTEL®, 3 Volt Fast Book Block Flash Memory, 28F800F3 and 28F160F3, Jan. 2000, pp. –51 pages.

INTEL®, Intel® Flash Data Integrator (FDI) User's Guide, Version 3.0, Aug. 2000, pp. –228.

* cited by examiner

Primary Examiner—Gary Portka
(74) Attorney, Agent, or Firm—Blakely, Sokoloff, Taylor & Zafman LLP

(57) ABSTRACT

The present invention is in the field of memory. More particularly, embodiments of the present invention can enhance an interface of a memory device by processing more than one request at a time.

28 Claims, 6 Drawing Sheets

VIRTUAL-PORT MEMORY AND VIRTUAL-PORTING

FIELD OF INVENTION

The present invention is in the field of data storage. More particularly, the present invention provides a method, apparatus, system, and machine-readable medium to process more than one request at a time.

BACKGROUND

A host requesting a read from a memory device, typically called a requester, can incur a significant amount of idle time as a result of the interface between the memory controller and the memory device. The memory controller may connect to multiple hosts via a bus to receive and respond to requests to read data from a memory device. The memory device may connect to the memory controller via a second bus such that the memory controller can forward a single read or write transaction from a requester to the memory device. The memory device can respond to the first request before accepting a second request. Before the memory controller forwards the request to the memory device, a second host may request a read from the same memory device, resulting in idle time for the second requester. For example, a second requester may request a read to obtain an address for a jump command within a software program. The code to execute at the address for the jump command may be critical data because the address may be in memory within the second requester, but the second requester may not execute the code until it receives the address. Further, the second requester will not receive that address until after the response to the first requester is complete. Thus, the second requester can remain idle from the moment it needs the address until the memory controller returns a complete response to the first requester and returns the critical data to the second requester.

While the memory device may receive and process one request at a time, hardware within the memory device connected to memory units may remain idle during the processing of that request. For example, the memory device may have several partitions of memory and each partition may have several memory-sensing devices. However, a memory-sensing device in one partition may perform the entire request while memory sensing devices in the same partition and other partitions remain idle.

Systems may reduce the frequency of a host's idle time by attaching multiple memory devices to the memory controller or incorporating a very high performance memory device that can handle parallel requests, i.e. a multiple-port memory device. Using multiple memory devices, however, can be disadvantageous as a result of added component costs, complexity for the memory controller, costs in terms of modifying the data bus to connect the memory controller to the multiple memory devices, space used by the bus in the extra memory devices, and space within the host system. Similarly, a very high performance memory device can be cost-prohibitive from a design standpoint as well as complicated as a result of competition between hosts for lower latency access to the single memory device.

BRIEF FIGURE DESCRIPTIONS

In the accompanying drawings like references may indicate some similarities between elements:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated are too numerous to discuss individually so the detailed descriptions below are designed to make such embodiments obvious to a person of ordinary skill in the art.

Figure 1:
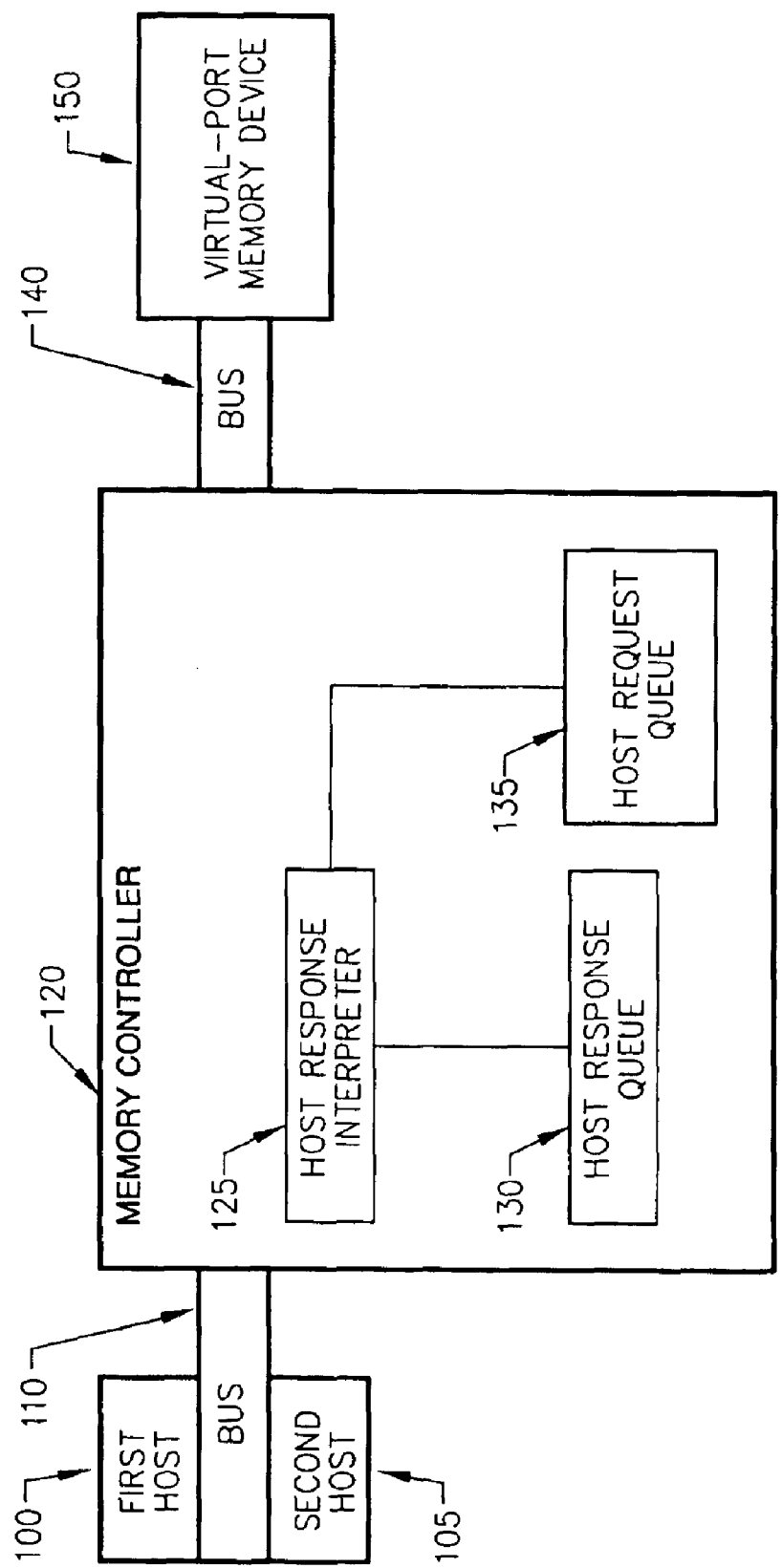
FIG. 1 depicts a digital data storage and retrieval system with multiple hosts.

Referring to FIG. 1, there is shown an example system embodiment. A first host 100 and a second host 105 couple to a memory controller 120 via a bus 110. The first host 100 and second host 105 are microprocessor-based systems that can access the virtual-port memory device 150. The bus 110 may be a data bus that can transmit a single transaction at a time from either the first host 100 or the second host 105 to the memory controller 120. For the present example embodiment, the first host 100 and the second host 105 have equal access to bus 110 via a round robin type arbitration scheme. In some embodiments, memory controller 120 may also have access to bus 110 to respond to a transaction initiated by a host, to return a status of a transaction initiated by a host, or to return data retrieved from virtual-port memory 150 for a host.

Memory controller 120 may receive a transaction from first host 100 or second host 105 and forward that transaction to virtual-port memory device 150 via bus 140. The memory controller 120 may be designed to interact with one or more data storage devices such as flash memory, random access memory, static random access memory, dynamic random access memory, read only memory, etc. . . . When bus 140 is busy with another transaction, memory controller 120 can store the transaction from a host until bus 140 is available. Similarly, memory controller 120 can store a transaction from either the first host 100 or the second host 105 when the virtual-port memory device 150 is busy with another transaction, typically referred to as a request. Memory controller 120 comprises a host response interpreter 125, a host response queue 130, and a host request queue 135. The host request queue 135 may store a request from the first host 100 or the second host 105 until bus 140 and virtual-port memory device 150 are available to receive the request. For example, memory controller 120 may receive a read request from first host 100 and attempt to forward the transaction to the virtual-port memory device 150. The virtual-port memory device 150 may reply to the request from the memory controller 120 with a busy or retry, and store the request from first host 100 in the host request queue 135. In addition, the second host 105 may initiate a request for a read from virtual-port memory device 150 on bus 110. Memory controller 120 may give a higher priority to the request from host 100 since it was first in time so the request from second host 105 may be stored in the host request queue 135 in a second priority position. In some embodiments, the memory controller 120 may store a priority tag with the transaction in the host request queue 135.

In other embodiments, the first host 100 or the second host 105 may attach a priority to the transaction forwarded to the memory controller 120.

When the virtual-port memory device 150 becomes available, the memory controller 120 may forward the first transaction, the highest priority transaction in the host request queue 135, via bus 140. Then, the memory controller 120 can forward the second request in the host request queue 135 to the virtual-port memory device 150 when the bus 140 and virtual-port memory device 150 are available to receive the request. The virtual-port memory device 150 may be available as soon as the bus 140 becomes available since the virtual-port memory device 150 can handle more than one request simultaneously. The virtual-port memory device 150 can comprise redundant circuitry to sense data to facilitate sensing data of more than one request simultaneously. In many embodiments, the virtual-port memory device 150 may sense critical data of a second request prior to completing a response to a first request. In particular, these embodiments may return critical data of a number of requests, e.g. the first and second request, prior to returning the non-critical data of those requests. Thus, the idle time of a host waiting to receive critical data may be attenuated.

Referring still to FIG. 1, the host response interpreter 125 may receive responses from virtual-port memory device 150 via bus 140. The host response interpreter 125 may interpret the priority of the response to determine when a response should be forwarded immediately to the requester. When the response from the virtual-port memory device 150 comprises critical data, or high priority data, the host response interpreter 125 may initiate a transaction on bus 110 to return the critical data to the requester as soon as bus 110 becomes available. In some embodiments, the response received from the virtual-port memory device 150 contains a tag to identify a transaction of a sequence and the host response interpreter 125 may combine several responses from the virtual-port memory device 150 into a burst response transaction according to the tag to send to the requester. The response can be combined by the host response interpreter 125 in the host response queue 130. Further, when bus 110 is busy, the memory controller 120 may be unable to initiate a transaction to return data to the host requester so the response may be stored in the host response queue 130.

In some embodiments, the host response interpreter 125 may combine the responses into a burst response transaction as it stores the responses in host response queue 130. In other embodiments, the critical data may be placed in the host response queue 130 and the requester, the first host 100 or the second host 105, may retrieve the data from the host response queue 130. Similarly, the requester may retrieve the burst transaction stored in host response queue 130.

The virtual-port memory device 150 may receive more than one request via bus 140, sense the critical data for each request, and return the critical data to the memory controller 120 as soon as bus 140 is available. In some embodiments, the critical data is returned to the memory controller 120 in a chronological sequence of receipt. In other embodiments, the memory controller 120 may forward a priority indication along with each request and the critical data may be returned to the memory controller 120 in the order of priority. When the request from the memory controller 120 also comprises a transaction tag identifying the requester, the virtual-port memory device 150 may return the critical data in any order with that identification attached. For instance, the critical data for the second request received by the virtual-port memory device 150 may be available to return to the memory controller 120 before the critical data for the first request so the arbiter of the virtual-port memory device 150 can return the critical data for the second request first. In alternative embodiments, the memory controller 120 may continue to request the highest priority critical data from the virtual-port memory device 150 and read the critical data out of a queue in the virtual-port memory device 150 when it becomes available. The virtual-port memory device 150 may then sense non-critical data requested by a host. In many embodiments, the virtual-port memory device 150 can begin sensing non-critical data while or before completing a sense of critical data.

Data for more than one request may be sensed simultaneously or substantially simultaneously when more than one sensing device is available. For example, virtual-port memory device 150 may service a request from first host 100 and a request from second host 105. The first host 100 may request a read of eight words of data from one partition and the second host 105 may request a read of eight words of data from a second partition within the virtual-port memory device 150. Four words from each request may be performed simultaneously or substantially simultaneously because the memory sensing devices in each partition may handle four reads simultaneously or substantially simultaneously. Several embodiments comprise an arbiter that can determine when a request, such as a request for a critical word, should be in the first group of four words sensed for first and the second request.

The output of each memory-sensing device in the virtual-port memory device 150 may be coupled to an output queue to facilitate a response to the memory controller 120. In some embodiments, a pointer for the queue can determine the address in the queue for the data sensed by the memory-sensing device. Many of the embodiments increment a pointer each time new data is placed in the queue. In other embodiments, an arbiter can adjust the pointer to point at an address based on the priority determined for the data sensed or the pointer location may be based on the physical location of the memory-sensing device. For instance, the arbiter may reserve part of the queue for critical data or for an offset for each unit of critical data in the queue, determine the address for a pointer for a memory-sensing device, and comprise a priority determiner to determine the data to be treated as critical data.

Once data is available in the virtual-port memory device 150 to return to the memory controller 120, the virtual-port memory device 150 may transmit the data in a time sliced manner. For example, the virtual-port memory device 150 may return a first word in response to the request from first host 100 since it was received first chronologically, then a second word in response to the request from second host 105, then a third word in response to requests from first host 100 again, and continue to alternate between hosts in fixed time intervals until the complete requests for both the first host 100 and the second host 105 are returned to memory controller 120. In several of these embodiments, the fixed time intervals can be selected based upon the priority of the request for the data.

In alternate embodiments, a dedicated packet identification (ID) may be used to transmit an ID along with the transaction from the first host 100 or the second host 105 to the memory controller 120. In many of these embodiments, the memory controller 120 may assign an abbreviated tag to forward to the virtual-port memory device 150. For instance, when the virtual-port memory device 150 accepts two requests at any one time, the memory controller 120 can use a single binary digit to identify the transaction. A "0" may indicate the first request chronologically sent to the virtual-port memory device 150 and a "1" may indicate the second request chronologically sent the virtual-port memory device 150. In other cases, the binary digit may just be alternated as a request is sent and received from memory controller 120. In further embodiments, a multiplexing procedure may be implemented to return data from the virtual-port memory device 150 to the memory controller 120. In many of these embodiments, a protocol for the virtual-port memory device 150 in the memory controller 120 to follow can coordinate the exchange of requests and responses such that the memory controller 120 can identify each response from virtual-port memory device 150 with a transaction from a host without additional communication.

Figure 2:
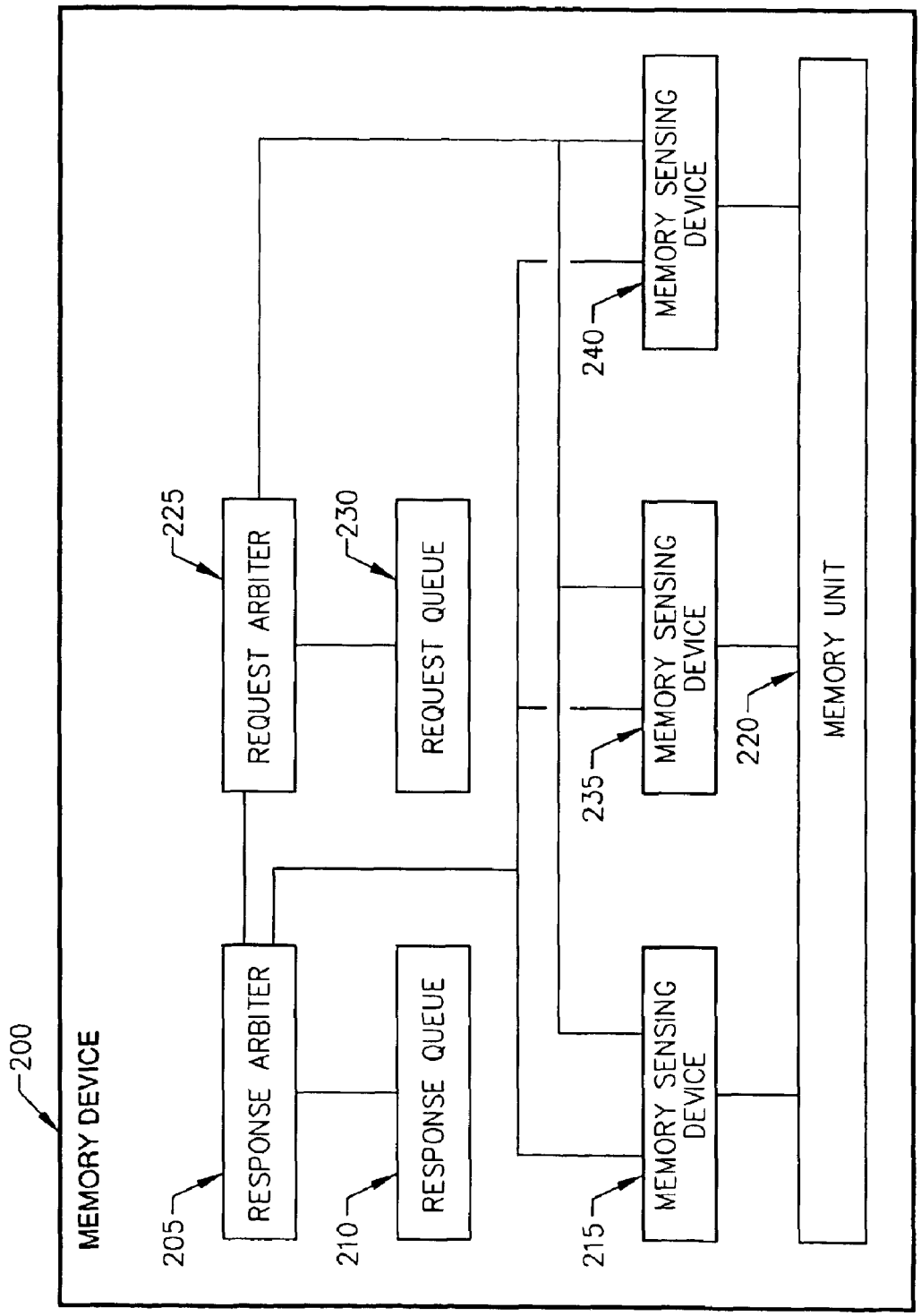
FIG. 2 depicts a data storage and retrieval system.

Referring now to FIG. 2, there is shown an example embodiment. The memory device 200 may comprise a response arbiter 205, a response queue 210, a request arbiter 225, a request queue 230, memory sensing devices 215, 235 and 240, and a memory unit 220. The request arbiter 225 can be designed to receive requests to sense memory, assign requests or parts of requests to a group such that the data within that group can be sensed simultaneously or substantially simultaneously, and comprise a priority determiner to determine the sequence that each group should be acted upon. In many embodiments, the request arbiter 225 can forward read requests to an idle memory sensing device 215, 235, and 240, as soon as the request is received. Many embodiments comprising redundant circuitry to sense data simultaneously may handle more than one request efficiently since requests may focus on one area of memory, such as a partition or group of partitions. When requests received by an embodiment leave redundant circuitry idle, the embodiment may indicate that it is available for an additional transaction until either the redundant circuitry is used or the request queue to store requests reached full capacity. Several of these embodiments design the request queue 230 to store a number of requests based on the types of transactions typically received by the embodiment. In the present embodiment, the request arbiter 225 is coupled to the request queue 230 to store requests until memory can be sensed in response to the requests. Further, the request arbiter 225 is coupled to the memory sensing devices 215, 235 and 240 to coordinate sensing of the groups of requests.

The request queue 230 may store the number of requests that can be handled by the memory device 200 at one time. The number of requests that can be handled by memory device 200 at one time may be based on the amount of redundant circuitry available, such as the memory sensing devices 215, 235 and 240, as well as, the number of these devices that can support simultaneous or substantially simultaneous transactions. For instance, memory sensing devices 215 and 240 may be able to sense data simultaneously but memory sensing devices 215 and 235 may not be able to sense data simultaneously. Many embodiments comprise parallel access to more than one request in the request queue 230.

Memory sensing devices 215, 235 and 240 can be designed to sense data in memory unit 220. In the present embodiment, memory-sensing devices 215, 235 and 240 are independently coupled to memory unit 220 to sense data simultaneously.

Memory unit 220 is designed to store data. Response arbiter 205 can receive data from memory sensing devices 215, 235 and 240, and store the data in response queue 210, when the data cannot or need not be returned immediately to the requester. The response arbiter also comprises a priority determiner to determine the sequence that the data should be returned to the requester. Critical data may be marked by placing the critical data in an area of the response queue 210 reserved for critical data or by associating the data with a tag in the response queue 210 to indicate to the response arbiter 205 that the data is critical data. In some embodiments, the response arbiter 205 can combine data received from memory sensing devices 215, 235 and 240 into burst transactions.

The response arbiter 205 can be coupled to the request arbiter 225 to correlate the data received from the memory sensing devices 215, 235 and 240 with the transaction or request for that data. For instance, the request may be accompanied by a 25 transaction ID or packet ID and the response arbiter 205 may associate the packet ID or transaction ID with the data before returning the data. In alternative embodiments, the functions of the response arbiter 205 and the request arbiter 225 can be combined into one arbiter for the memory device 200.

Referring still to FIG. 2, when one or more of the requests received by the memory device 200 comprise a request for critical data, a request arbiter 225 may mark the critical data requests as the highest priority requests to be sensed by memory sensing devices 215, 235 and 240. The response arbiter 205 can receive the critical data and return the critical data to the requester or memory controller as soon as possible or within a predetermined number of cycles. In some embodiments, the critical data is made available in the response queue 210 for the requester or memory controller to retrieve. Both critical data and non-critical data may be organized and transmitted by the response arbiter 205 to a host with burst granularity, in a serial manner, with word granularity in a time-sliced manner, or by mutual tracking by both the host and the memory device 200.

Although FIG. 2 illustrates a single serial port memory device that accepts multiple requests, embodiments may have more than one serial port, each port accepting more than one request. In addition, each serial port can have two or more memory sensing devices 215, 235 and 240 that can sense data from a memory unit simultaneously or substantially simultaneously. In many of these embodiments, the response queue 210 and the request queue 230 may be parts of the same memory.

Figure 3:
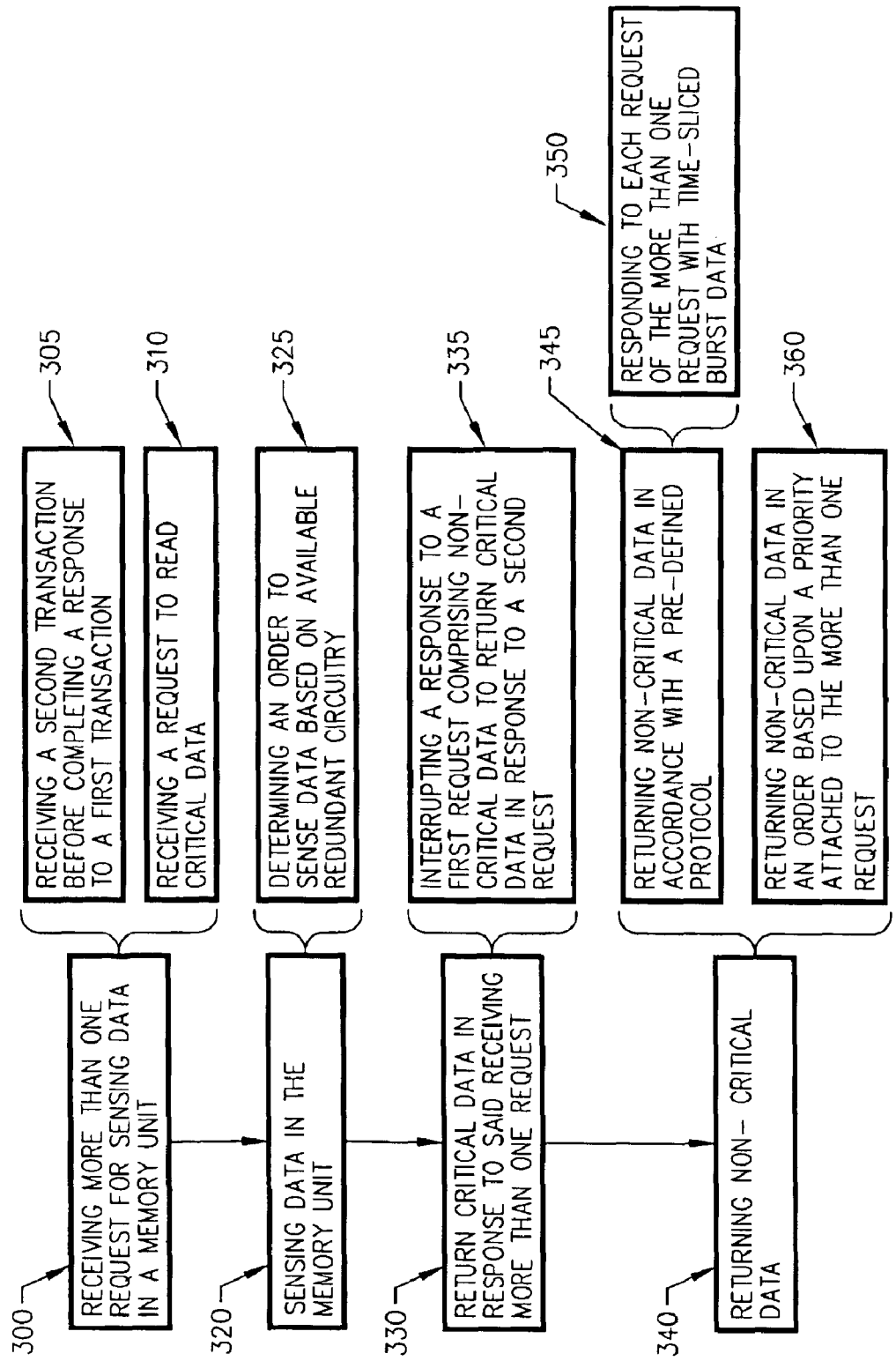
FIG. 3 depicts a flow chart to sense critical and non-critical data.

Referring now to FIG. 3, a flowchart of an example embodiment is shown. The flowchart of the example embodiment comprises receiving more than one request for sensing data in a memory unit 300, sensing data in the memory unit 320, returning critical data in response to said receiving more than one request 330, and returning non-critical data 340. Receiving more than one request for sensing data in a memory unit 300 can receive more than one request from a single host or a request from more than one host. In some embodiments, receiving more than one request for sensing data in a memory unit 300 can comprise receiving a request via a memory controller and storing the request in a request queue. Receiving more than one request for sensing data in a memory unit 300 may comprise receiving a second transaction before completing a response to a first transaction 305 or receiving a request to read critical data 310 or both.

Receiving a second transaction before completing a response to a first transaction 305 can comprise receiving one full transaction then receiving a second full transaction from a host via a memory controller. A second transaction may be received prior to completing the response to the first transaction to make use of redundant circuitry, e.g. sensing hardware, within a memory device. The redundant circuitry may be able to sense simultaneously or substantially simultaneously, facilitating low latency, high bandwidth access to a memory of the memory device. In some embodiments, receiving a second transaction before completing a response to a first transaction 305 may comprise receiving part of a response of a first transaction, part of a response of a second transaction, and then the remainder of the response of the first and the second transaction from a host. For example, the critical data portion of a first request may be received first, a critical data portion of a second request may be received second, and the remainder of the first and second requests may be received subsequently. In other embodiments, a portion of more than one request may be grouped by priority or sequence by a host or memory controller and received in a serial transmission according to the priority or sequence. Thus, critical data that may cause delay or idle time for hosts may be returned to the hosts quickly.

Receiving a request to read critical data 310 can comprise receiving a portion of a transaction or receiving a complete transaction. Levels of priority for critical data may be based on the priority of the function that the requester is performing, the priority of the requester, the amount of idle time incurred by the requester as a result of the delay, or a function of more than one of these factors. In some embodiments, receiving a request to read critical data 310 may comprise receiving groups of requests in descending priorities within a priority level range considered critical data. Many embodiments comprise receiving a transaction having a priority tag that indicates the request is for critical data. In other embodiments, receiving a request to read critical data 310 can distinguish priority levels for requests by receiving a transaction on the leading edge of the clock signal or the falling edge of the clock signal.

In FIG. 3, sensing data in the memory unit 320 can comprise instructing more than one memory sensing device to sense data simultaneously or substantially simultaneously in one or more priority levels or in a particular sequence. Sensing data in the memory unit 320 can comprise determining an order to sense data based on available redundant circuitry 325. Determining an order to sense data based on available redundant circuitry 325 can comprise immediately instructing memory sensing devices to sense the critical data or instructing memory sensing devices to sense the critical data as soon as memory sensing devices become available. Determining an order to sense data based on available redundant circuitry 325 can comprise ordering non-critical data according to chronological order of receipt of the requests for the non-critical data, ordering non-critical data according to a priority tag received with the request to sense the non-critical data, and ordering the non-critical data according to the ability to sense the data simultaneously or substantially simultaneously. In some embodiments, sensing data in the memory unit 320 can comprise instructing one or more memory sensing devices to sense the requested data. In further embodiments, sensing data in the memory unit 320 may also comprise storing the data in a response queue, combining the data into burst transactions, and/or forwarding the data immediately to the host, e.g. the memory controller or requester.

Returning critical data in response to said receiving more than one request 330 may apply a higher priority to a request for critical data than a response to a host that contains non-critical data. Interrupting a response to a first request comprising non-critical data to return critical data in response to a second request 335 may embody a result of the higher priority for critical data requests. Interrupting a response to a first request comprising non-critical data to return critical data in response to a second request 335 may forward critical data sensed in response to a second request to the corresponding host before completing a response to a first request having non-critical data. For example, a first request may be received from a host that comprises critical data and non-critical data. Sensing data in the memory unit 320 may sense the critical data and the critical data may be returned to the host. Then, sensing data in the memory unit 320 may begin sensing non-critical data. While non-critical data is being returned to the host in response to the first request, a second request may be received comprising a request for critical data. Returning critical data in response to said receiving more than one request 330 may interrupt the transaction returning the non-critical data in response to the first request to return the critical data in response to the second request. Then returning non-critical data 340 may return the remainder of the non-critical data for the first request and second request. In some embodiments, the remainder of the non-critical data for the first request can be returned before returning the non-critical data for the second request. In other embodiments, the non-critical data for the first request is broken into units and alternating units of non-critical data for the first request and second request are returned. The units can be words, double words or any other convenient granular size.

Returning non-critical data 340 can comprise returning non-critical data in accordance with a pre-defined protocol 345 and/or returning non-critical data in an order based upon a priority attached to the more than one request 360. When returning non-critical data in accordance with a pre-defined protocol 345 many different methods of returning data for more than one request can be implemented including responding to each request of the more than one request with time-sliced burst data 350.

Responding to each request of the more than one request with time-sliced burst data 350 can comprise returning one word per request each clock cycle and alternating between the first request and the second request each clock cycle. On the other hand, if a second request is received two clock cycles after a first request is received, responding to each request of the more than one request with time-sliced burst data 350 can comprise returning one word per clock cycle for two clock cycles for the first request, then returning one word per clock cycle for two clock cycles for the second request and so on, alternating between the first request and the second request until data completely responding to the first request and the second request is returned to the host.

Returning non-critical data in an order based upon a priority attached to the more than one request 360 may include grouping data sensed in response to the first request into a first priority level, returning the data in a burst transaction to the host, then returning the sensed data in response to the second request at the same priority level to the host. Data sent in response to the first request and the second request can be returned in descending priority levels, in an alternating procedure, until all the data sensed in response to the first request and second request is returned to the host. Returning non-critical data in an order based upon a priority attached to the more than one request 360 can also comprise interpreting a priority tag attached to the request for the data. For example, while receiving a first request, a tag indicating the priority level of the data requested may be periodically received, classifying each data request within a transaction. The data may be sensed in a sequence from highest to lowest priority then returned to the host in the same highest to lowest priority sequence. When a second request is received containing the same and higher priority data request, the higher priority data request sensed in response to the second request may be returned to the host prior to returning data sensed in response to lower priority data requests in the first transaction. Then data sent in response to the first request may be returned in an alternating order according to descending priority with data sensed in response to the second request.

In alternative embodiments, returning non-critical data in accordance with a pre-defined protocol 345 can comprise alternating between each pending request, every leading edge of a clock cycle or every falling edge of a clock cycle. In some of these embodiments, the priority level of a first request in a first transaction can be incremented as additional transactions are received to prevent the lowest priority request within the first transaction from being continually superseded by subsequent, higher priority requests in subsequent transactions.

In still further embodiments, the first unit of data in a request may be defined as critical data and the remaining units of data requested may be defined as non-critical data. For example, a first requester may request two or more words of data in a transaction. The first word is defined as a critical word of data and the remaining one or more words requested in that transaction are defined as non-critical words. The first word can be sensed and transmitted back in a response as soon as possible. When a second transaction is received, the first word can be sensed and given priority to be transmitted higher than transmitting a response comprising the non-critical data of the first transaction.

Figure 4:
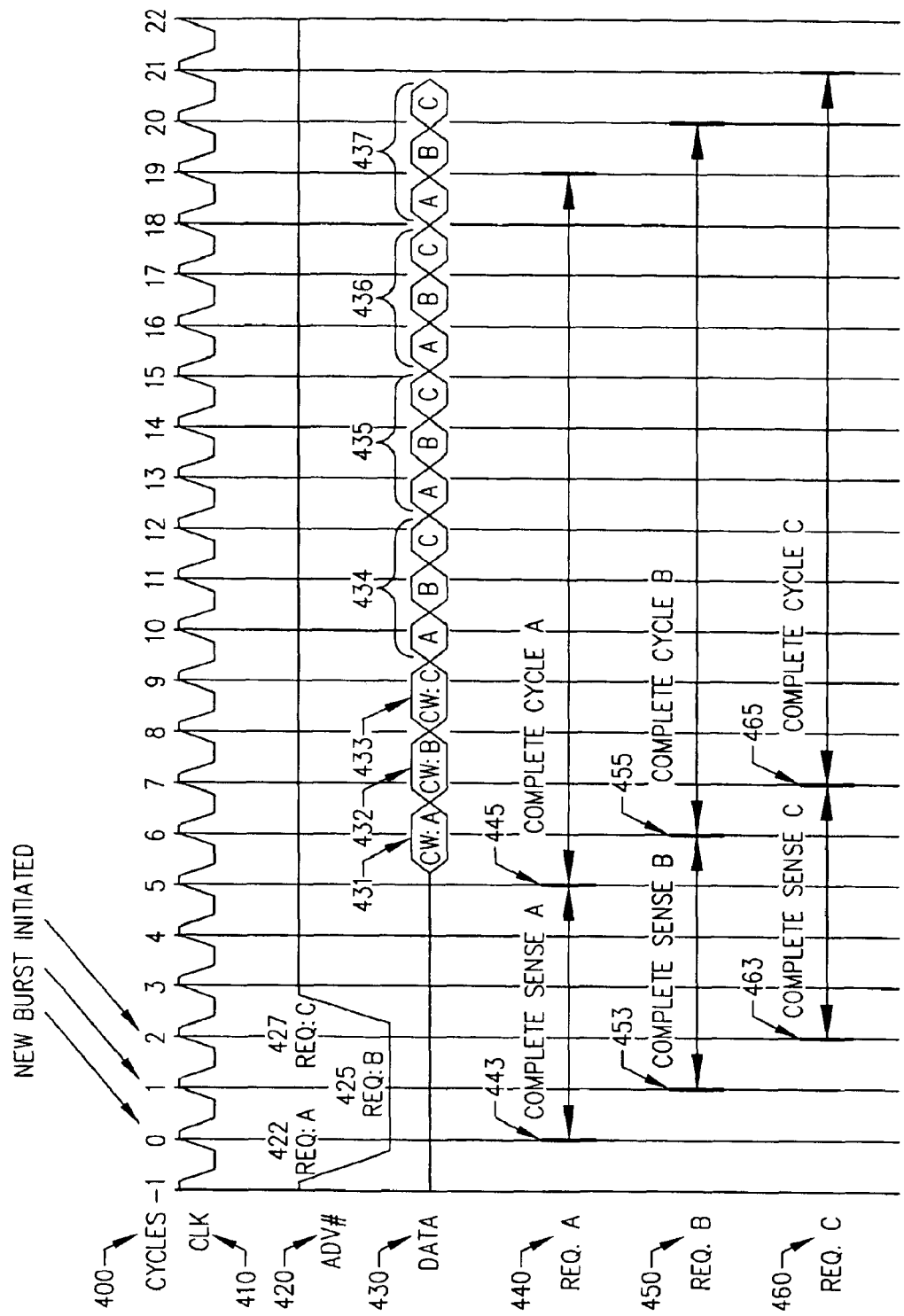
FIG. 4 depicts a timing diagram for three requests to sense data.

Referring now to FIG. 4, there is shown a timing diagram of example embodiments. The timing diagram illustrates actions of example embodiments to a specific set of requests in a time window from negative one to twenty-two clock cycles 400. The clock signal (CLK) 410 is illustrated for each cycle. The valid address received signal (ADV#) 420 indicates that a valid address was received for Req. A 422 at cycle 0, Req. B 425 at cycle 1, and Req. C 427 at cycle 2. In addition, the timing diagram illustrates when the data is being transferred on the data signal line 430 as well as the status of requests A, B and C, on lines REQ A 440, REQ B 450, and REQ C 460, respectively.

Sensing data in the memory unit in response to request A commences upon receiving a valid address for request A 422, as illustrated by complete sense A 443. Returning the critical data in response to request A, critical word (CWA) 431, can commence upon the completion of complete sense A 443 at the beginning of complete cycle A 445. One cycle after receiving a valid address for request A 422, a valid address for request B 425 is received. Complete sense B 453 is initiated upon receiving the valid address for request B 425 and completes one cycle after complete sense A 443. Complete sense C 463 is initiated upon receiving a valid address for request C 427, one cycle after receiving the valid address for request B 425, and ends one cycle after complete sense B 453. Thus, the critical word sensed in response to request B (CWB) 432 is returned to the host immediately after CWA 431 and the critical word sensed in response to request C (CWC) 433 is returned to the host immediately following CWB 432.

Upon returning the critical words of requests A, B and C to the host, the non-critical data for requests A, B and C, 434, 435, 436, and 437, are returned to the host. In the present embodiments, the sensing of data for requests A, B and C completes in cycles 5, 6 and 7, respectively, so all the data requested by requests A, B and C are stored in a response queue awaiting transactions to return the data to the host. The non-critical data sensed in response to requests A, B and C, as illustrated by data groups 434, 435, 436 and 437, return the non-critical data to the host in a time-sliced, one-word-burst transaction. More specifically, non-critical data sensed in response to request A are returned on the falling edge of cycles 8, 11, 14 and 17 in non-critical data groups 434, 435, 436 and 437. Non-critical data sensed in response to request B are returned one cycle after each word of non-critical data is returned in response to request A. Further, non-critical data for request C is returned one cycle after non-critical data for request B is returned within the same data groups 434, 435, 436 and 437.

Referring still to FIG. 4, sensing data for more than one request simultaneously or substantially simultaneously is illustrated by the status lines complete sense A 443, complete sense B 453 and complete sense C 463. During cycles 2, 3 and 4, data is being sensed in response to requests A, B and C. During cycles 1 and 5, data is being sensed in response to requests A and B, and B and C, respectively. Under alternative conditions such as when a valid address is received for request B 425 more than one cycle after request A 422, the critical word sensed in response to request B, CWB 432, may be returned to the host more than one cycle CWA 431 is returned to the host. In alternative embodiments, data may be returned to the host on the rising edge of the clock signal 410. Further, some embodiments allow more than one word to transfer back to the host during a single cycle. In still further embodiments, two or more requests may be received depending upon the availability of redundant circuitry. Redundant circuitry may be spread across more than one partition of memory so the number of transactions that may be handled simultaneously or substantially simultaneous may be dependent upon the location of the memory being sensed by each transaction. For instance, if a transaction focuses on one section of memory, other sections of the memory may be coupled to redundant circuitry that can remain idle unless an additional transaction is accepted.

Figure 5:
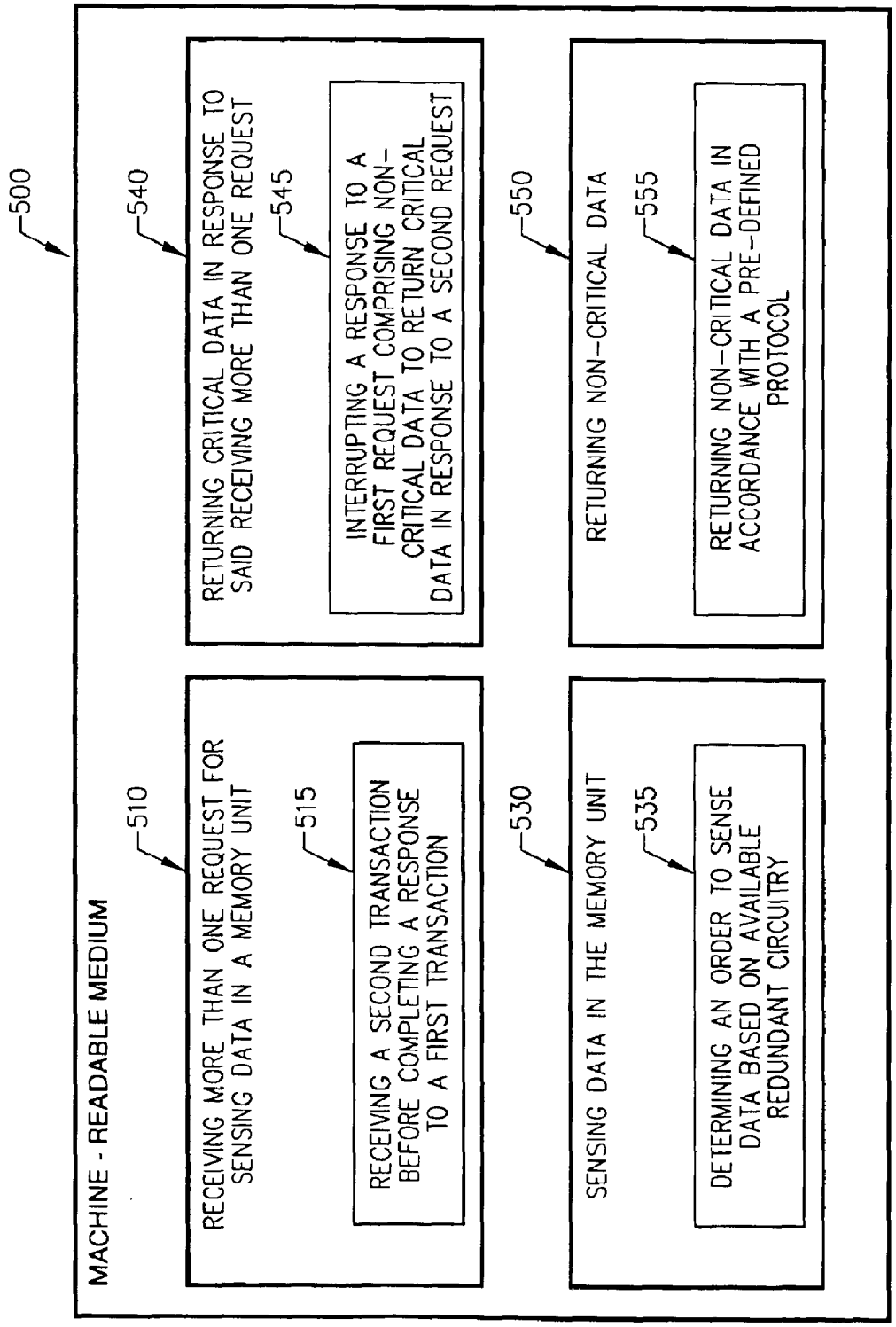
FIG. 5 depicts a machine-readable medium comprising instructions to sense data.

Referring now to FIG. 5, a machine-readable medium embodiment is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments can comprise more than one machine-readable medium depending on the design of the machine.

The machine-readable medium 500 can comprise instructions for receiving more than one request for sensing data in a memory unit 510, sensing data in the memory unit 530, returning critical data in response to said receiving more than one request 540, and returning non-critical data 550. Receiving more than one request for sensing data in a memory unit 510 may include receiving a first request and a second request and storing the requests within a request queue. When the first request comprises a request for critical data, sensing data in the memory unit 530 can include initiating the sensing of the critical data. When the second request to sense data comprises a request to sense critical data, the critical data for the second request may be sensed simultaneously, substantially simultaneously, or immediately following the sensing of critical data for the first request. Receiving more than one request for sensing data in a memory unit 510 may comprise receiving a second transaction before completing a response to a first transaction 515. Receiving a second transaction before completing a response to a first transaction 515 may comprise receiving more than one transaction to read non-critical data and storing the non-critical read requests in a request queue. Instructions to receive a second transaction prior to completing a response to a first transaction can facilitate efficient use of redundant sensing hardware in a memory device. For example, a memory device may have sensing hardware that may remain idle while processing a first transaction when the first transaction requests data from the same partition or partitions of memory. Accepting a second transaction, or more, may allow hardware in other partitions of the memory device to sense data simultaneously or substantially simultaneously. Further, critical data requested in the second request may be sensed prior to completing a response to the first request to reduce the occurrence of idle time in a host resulting from waiting for critical data.

Sensing data in the memory unit 530 can comprise instructions for determining an order to sense data based on available redundant circuitry 535. Determining an order to sense data based on available redundant circuitry 535 may give read requests a priority based upon an efficient use of the memory sensing devices, an effective way to facilitate returning non-critical data in accordance with a defined protocol 555, and the chronological order that each memory request was received. When sensing data in the memory unit 530 finishes sensing critical data, determining an order to sense data based on available redundant circuitry 535 may then determine a priority for the non-critical data of each received request.

Returning critical data in response to said receiving more than one request 540 may return the critical data from each received request in a pipelined-burst transaction. Returning critical data in response to said receiving more than one request 540 can comprise interrupting a response to a first request comprising non-critical data to return critical data in response to a second request 545. For example, upon returning the critical data for the first request, interrupting a response to a first request comprising non-critical data to return critical data in response to a second request 545 may comprise instructions to return the critical data to the second request rather than continuing to return the non-critical data of the first request. When critical data is not requested in a second request, some embodiments may continue to complete the first request, including the non-critical data, before initiating the return of data sensed in response to the second request. Many embodiments returning critical data in response to said receiving more than one request 540 may also comprise returning the critical data of each of the more than one request by multiplexing the critical data.

Returning non-critical data 550 may comprise returning the non-critical data to the host in an order based upon priority. Returning non-critical data 550 can comprise instructions for returning non-critical data in accordance with a pre-defined protocol 555. Returning non-critical data in accordance with a pre-defined protocol 555 may allow tracking of events by the host without requiring a status to be returned to the host for each event. For example, when a second request is received four cycles after a first request, a pre-defined protocol may provide instructions requiring that returning data to the host alternate every four cycles between data sent in response to the first request and data sent in response to the second request.

Figure 6:
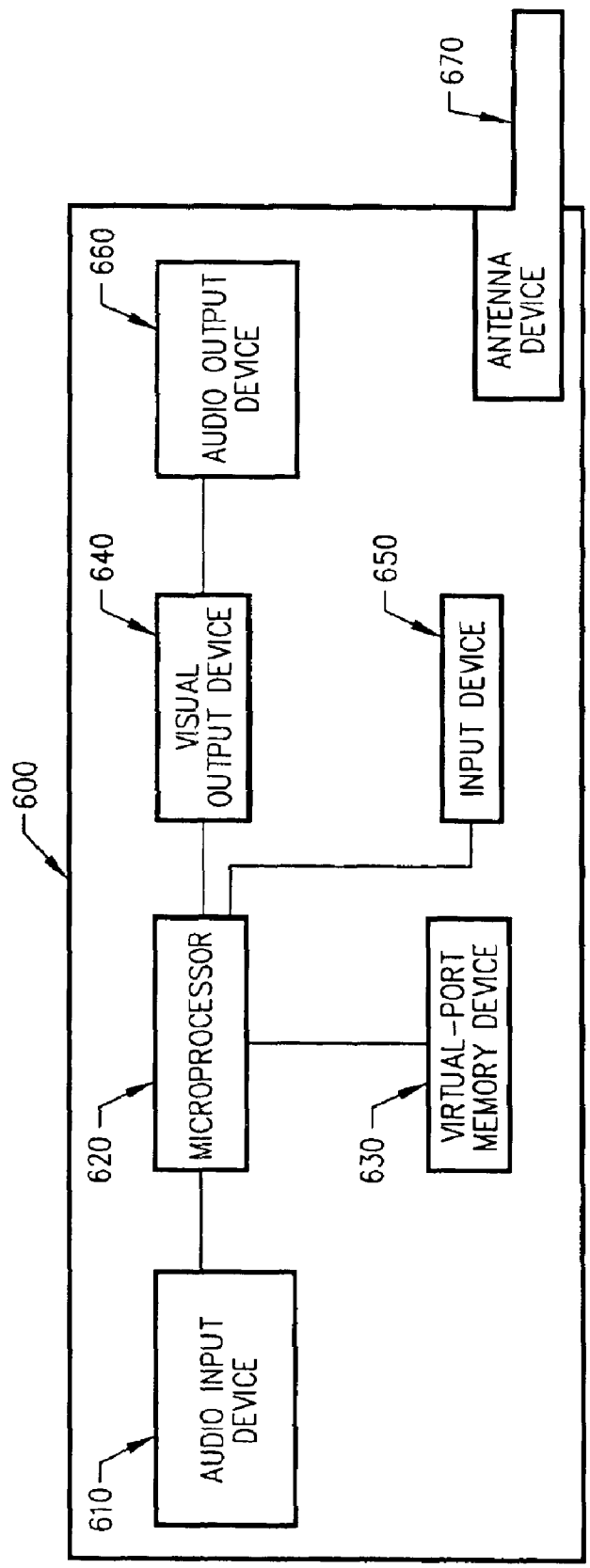
FIG. 6 depicts a wireless communications device.

Referring now to FIG. 6, there is shown an example system embodiment 600. The embodiment 600 is designed to be a communication device, such as a cellular phone or personal digital assistant, and may have audio and digital messaging such as voice and electronic mail (email) functions. The embodiment 600 may comprise input-output devices such as an audio input device 610, a visual output device 640, an input device 650, an audio output device 660, and an antenna 670, and comprise a microprocessor 620 and a virtual-port memory device 630. The audio input device 610 may receive analog audio input, convert the input to a digital format with an analog to digital (A/D) converter, and transmit the converted input to the microprocessor 620.

The microprocessor 620 may receive digital data and process the data according to instructions in the virtual-port memory device 630. For example, the virtual-port memory device may comprise protected memory or read-only memory comprising data representing instructions of basic functions for the embodiment 600. In some embodiments, basic functions can comprise instructions to display characters on the visual output device 640, interpret input from the input device 650, activate the audio output device 660, and receive and transmit data via the antenna device 670. Instructions for more advanced functions, such as displaying messages, may be stored in memory locations that can be rewritten so the instructions may be updated to increase the functionality of the embodiment 600. Many embodiments include instructions to switch between receiving and transmitting analog data and receiving and transmitting digital data. Further embodiments also comprise different instructions to optimize power consumption by the embodiment 600 depending upon whether data transmitted and received is digital or analog. For instance, an A/D converter in the audio input device 610 and a digital to analog (D/A) converter in the audio output 660 may be switched out of an active or powered circuit when the embodiment 600 is transmitting and receiving analog data, such as a person's voice as captured by a microphone and combined with a carrier wave.

The virtual-port memory device 630 may receive more than one request to read data, place a priority on critical data, and return non-critical data to the microprocessor 620 by multiplexing or time-slicing the data. In alternative embodiments, the virtual-port memory device 630 may receive packet identifications, identifying the priority level of each read request. In some embodiments, each read request for an idle memory sensing device is forwarded immediately to the idle memory sensing device such that more than one sensing device can be sensing data at respective memory locations at one time. Also, by forwarding the read requests immediately to an idle sensing device, the virtual-port memory device can support low latency and high bandwidth data transfers of the microprocessor 620.

Many embodiments include an N-deep, request queue in the virtual memory device 630 to service requests wherein N is the number of requests that can be handled in parallel by the virtual-port memory device 630. In several embodiments, each request stored in the request queue can be accessed in parallel. Accessing the requests in parallel may allow the requests to be processed simultaneously or substantially simultaneously.

When critical data is sensed, the data may be forwarded directly to a critical data location in an output burst queue of the virtual-port memory device 630. The output burst queue may transmit the critical word to the microprocessor 620 as soon as a specified unit size is made available in the critical data section of the output burst queue and when the coupling between the virtual-port memory device 630 and the microprocessor becomes available. In alternative embodiments, a transmission, other than a critical data transmission to the microprocessor, may be interrupted to forward critical data to the microprocessor 620. In many of these embodiments, the critical data is transmitted to the microprocessor 620 in one word or double word bursts.

Referring still to FIG. 6, the visual output device 640 can receive instructions from the microprocessor 620 to display messages, like email, alpha-numeric pages, phone book entries, and text-based web sites. An input device 650 can couple to the microprocessor 620 to allow a user to enter instructions or data, such as a phone number or email address. The input device 650 may be a transparent, capacitive switch grid incorporated in the visual output device 640 to allow a user to touch a part of the visual output device 640 to enter a character or select a function.

Still referring to FIG. 6, the audio output device 660 may comprise a speaker coupled to a D/A device and can output data received via the antenna device 670. Further, the antenna device 670 may comprise a receiver and transmitter for high frequency, analog and digital data transmissions. For example, if the embodiment 600 is at a location where digital cellular services are available, the antenna device 670 may transmit and receive digital voice data, periodic digital time indications, and transmit digital voice data.

What is claimed is:

1. An apparatus, comprising:
   a memory unit to store data;
   a plurality of memory-sensing devices coupled to the memory unit to sense the data stored in the memory unit substantially concurrently;
   a request queue coupled to the memory unit via the memory-sensing devices, the request queue storing one or more requests while the memory-sensing devices are sensing data in the memory unit;
   a response queue coupled to the memory-sensing devices, the response queue storing data from the memory-sensing devices that is not required to be returned to a requester immediately; and
   an arbiter coupled to said response queue to transmit one or more responses stored in the response queue to a requester in an order based on a priority of the respective request corresponding to the response,
   wherein the one or more requests include a first request from a first requester for requesting data having a first portion and a second portion, and a second request from a second requester received after the first request for requesting data having a first portion and a second portion, wherein the first portion of the second request is returned to the second requester before the second portion of the first request is returned to a first requester, and wherein the second portion of the second request is returned after one of the first and second portions of the first request.

2. The apparatus of claim 1, wherein the memory-sensing devices comprise redundant circuitry capable of sensing data in the memory unit independently and substantially simultaneously.

3. The apparatus of claim 1, wherein said request queue comprises memory to store more than one request.

4. The apparatus of claim 3, wherein the memory to store more than one request comprises memory to service more than one request substantially simultaneously.

5. The apparatus of claim 1, wherein said response queue comprises memory to store data for a response.

6. The apparatus of claim 1, wherein said arbiter comprises a response arbiter to determine a response to more than one request.

7. The apparatus of claim 6, wherein the response arbiter comprises a priority determiner to determine a priority of a response to a request, wherein a response having a higher priority is returned to the requester prior to a response having a lower priority.

8. The apparatus of claim 6, wherein said arbiter comprises a request arbiter coupled to said request queue, wherein the request arbiter transmits a request having a higher priority to a memory-sensing device prior to transmitting a request having a lower priority.

9. The apparatus of claim 8, wherein the one or more requests include a first request for non-critical data and a second request received after the first request for critical data, and wherein the second request is transmitted to an idle memory-sensing device prior to the first request.

10. The apparatus of claim 9, wherein if no idle memory-sensing device is available, the request arbiter stores the first and second requests in the request queue in an order, such that the second request is processed prior to processing the first request when an idle memory-sensing device becomes available.

11. The apparatus of claim 10, wherein the request arbiter marks the second request having a higher priority than the first request when storing the first and second requests in the request queue.

12. The apparatus of claim 9, wherein in response to the first and second requests, the critical data and the non-critical data are stored in the response queue in an order, such that the critical data is turned to the respective requester prior to returning the non-critical data.

13. The apparatus of claim 12, wherein the critical data is stored in a dedicated area of the response queue, and wherein data in the dedicated area of the response queue is returned to the respective requester prior to returning data in a remaining area of the response queue.

14. The apparatus of claim 12, wherein the critical data stored in the response queue is associated with a tag indicating to the response arbiter that the associated data should be returned in a relatively high priority.

15. The apparatus of claim 8, wherein the one or more requests include a first request for a first data having a critical portion and a non-critical portion, and a second request received after the first request for a second data having a critical portion and a non-critical portion, and wherein the critical portions of the first and second requests are processed by one or more idle memory-sensing devices prior to processing the non-critical portions of the first and second requests.

16. The apparatus of claim 15, wherein if no idle memory-sensing device is available, the request arbiter stores the first and second requests in the request queue in an order, such that the critical portions of the first and second requests are processed prior to processing the non-critical portions when an idle memory-sensing device becomes available.

17. The apparatus of claim 16, wherein the request arbiter marks the critical portions of the first and second requests having a higher priority than the non-critical portions when storing the first and second requests in the request queue.

18. The apparatus of claim 15, wherein in response to the first and second requests, the critical data and the non-critical data are stored in the response queue in an order, such that the critical data is turned to the respective requester prior to returning the non-critical data.

19. An apparatus, comprising:
   a memory unit to store data;
   a plurality of memory-sensing devices coupled with said memory unit, the plurality of memory-sensing devices capable of sensing data stored in the memory unit substantially concurrently;

a request queue coupled with said memory sensing devices to receive more than one request to sense data in said memory unit;

an arbiter coupled with said memory sensing devices to determine the sequence to return the data in response to the more than one request, the data being returned in an order based on a priority of the respective request determined by the arbiter, wherein the more than one request includes a first request from a first requester for requesting data having a first portion and a second portions and a second request from a second requester received after the first request for requesting data having a first portion and a second portion, wherein the first portion of the second request is returned to the second requester before the second portion of the first request is returned to a first requester, and wherein the second portion of the second request is returned after one of the first and second portions of the first request.

20. The apparatus of claim 19, further comprising a response queue coupled with said memory sensing device to store the data prior to the arbiter returning the data in the order based on the priority of the corresponding request.

21. The apparatus of claim 19, wherein said memory unit comprises a first partition and a second partition; and said memory-sensing device comprises redundant circuitry coupled with said memory unit to sense data in the first partition and the second partition substantially simultaneously.

22. The apparatus of claim 19, wherein said request queue comprises memory to store the more than one request.

23. The apparatus of claim 19, wherein said arbiter comprises a response arbiter coupled with said memory sensing device to determine a response to the more than one request.

24. The apparatus of claim 23, wherein the response arbiter comprises a priority determiner to determine a priority of the response to the more than one request.

25. The apparatus of claim 19, wherein said arbiter comprises a request arbiter coupled with said request queue to determine a priority to sense data in response to the more than one request.

26. A system, comprising:

a processor; and a memory device coupled to the processor, the memory device including a memory unit to store data, a plurality of memory-sensing devices coupled with said memory unit to sense the data stored in the memory unit substantially concurrently, a request queue coupled with said memory sensing devices to receive more than one request to sense data in said memory unit, and an arbiter coupled with said memory sensing devices to determine the sequence to return the data in response to the more than one request based on a priority of the requests determined by the arbiter, wherein the more than one request includes a first request from a first requester for requesting data having a first portion and a second portions and a second request from a second requester received after the first request for requesting data having a first portion and a second portion, wherein the first portion of the second request is returned to the second requester before the second portion of the first request is returned to a first requester, and wherein the second portion of the second request is returned after one of the first and second portions of the first request.

27. The system of claim 26, further comprising a memory controller coupled between said request queue and said processor.

28. The system of claim 26, further comprising an input-output device.

* * * * *

UNITED STATES PATENT AND TRADEMARK OFFICE
CERTIFICATE OF CORRECTION

PATENT NO. : 6,920,534 B2
DATED : July 19, 2005
INVENTOR(S) : Dover

It is certified that error appears in the above-identified patent and that said Letters Patent is hereby corrected as shown below:

<u>Column 6,</u>
Line 12, after "by a", delete "25".

Signed and Sealed this

Sixth Day of September, 2005

JON W. DUDAS
*Director of the United States Patent and Trademark Office*